United States Patent
Nan et al.

(10) Patent No.: US 10,725,477 B2
(45) Date of Patent: Jul. 28, 2020

(54) MOBILE ROBOT

(71) Applicant: SHENZHEN SILVER STAR INTELLIGENT TECHNOLOGY CO., LTD., Shenzhen, Guangdong (CN)

(72) Inventors: Shuaishuai Nan, Guangdong (CN); Huanqiang Li, Guangdong (CN)

(73) Assignee: SHENZHEN SILVER STAR INTELLIGENT TECHNOLOGY CO., LTD., Shenzhen (CN)

( * ) Notice: Subject to any disclaimer, the term of this patent is extended or adjusted under 35 U.S.C. 154(b) by 53 days.

(21) Appl. No.: 16/147,765

(22) Filed: Sep. 30, 2018

(65) Prior Publication Data
US 2019/0171222 A1    Jun. 6, 2019

(30) Foreign Application Priority Data
Dec. 5, 2017  (CN) .......................... 2017 1 1266058

(51) Int. Cl.
*G05D 1/02* (2020.01)
*A47L 9/00* (2006.01)

(52) U.S. Cl.
CPC .............. *G05D 1/0238* (2013.01); *A47L 9/00* (2013.01); *G05D 1/0242* (2013.01); *G05D 2201/0203* (2013.01); *G05D 2201/0215* (2013.01)

(58) Field of Classification Search
CPC ............ A47L 2201/04; A47L 2201/00; G05D 2201/0215; G05D 1/0238; G01J 5/089; B25J 11/0085; B25J 9/1664; B25J 9/0003; B25J 9/1666
USPC ........................................................ 250/338.1
See application file for complete search history.

(56) References Cited

U.S. PATENT DOCUMENTS

2016/0206164 A1*  7/2016  Oka ..................... A47L 9/0472
2019/0129034 A1*  5/2019  Yoshida ............... H04N 5/2256

OTHER PUBLICATIONS

"Infrared Proximity Sensor" to Kamal, dated Jan. 22, 2008 (Year: 2008).*

* cited by examiner

Primary Examiner — Kenneth J Malkowski

(57) ABSTRACT

A mobile robot, comprising: a body and a drive system for driving a movement of the mobile robot, a light emitter for emitting light toward a surface to be detected, a photoelectric sensor responsive to light from an environment and/or emitted by the light emitter, a variable impedance unit connected to the photoelectric sensor and having a reduced impedance when the photoelectric sensor is responsive to light of a preset intensity, and a control unit, where the light emitter is controlled by the control unit to form at least two operating states in which light is emitted at different intensities, and in the operating state other than the last operating state, if a sampling difference value determined when the light emitter is in the OFF state and ON state does not satisfy a preset condition, an operating state of the light emitter is changed to prevent misjudgment.

19 Claims, 5 Drawing Sheets

MOBILE ROBOT

CROSS-REFERENCE TO RELATED APPLICATION

This application claims priority to CN application No. 201711266058.0, filed on Dec. 5, 2017, titled "Mobile Robot". The entire content of which is incorporated herein by reference.

TECHNICAL FIELD

The present disclosure relates to the field of ground detection techniques of robots, and in particular to a mobile robot.

BACKGROUND ART

The existing ground detection system and wall surface detection system of a mobile robot each comprises at least one set of an infrared emission tube and an infrared receiving tube, the infrared emission tube is used for emitting infrared light, and the infrared receiving tube is used for receiving infrared light. The infrared light emitted by the infrared emission tube is reflected by the ground or a wall surface, and then is partially received by the infrared receiving tube. Different intensities of the infrared light received by the infrared receiving tube exhibit signals of different magnitudes. In the prior art, a signal of the infrared receiving tube (denoted as X1) is captured by turning on the infrared emission tube for a period of time, and then the infrared emission tube is closed for a period of time to capture the signal of the infrared receiving tube (denoted as X2), a difference (denoted as X3) is calculated between X1 and X2, and it is judged (determined) whether X3 stays within a preset threshold range so as to judge in which environment the mobile robot is placed.

However, once the design of the mobile robot is finalized, the sensitivity of the infrared receiving tube is fixed, and it is difficult to ensure that the ground detection system and the wall surface detection system can operate normally in three special environments, for example, on a ground or wall surface irradiated by (exposed to) strong light, a ground or wall surface with normal brightness, and a ground on which a black carpet is laid or a wall surface covered by a black light-absorbing material. In the environment of the ground or wall surface irradiated by strong light, no matter whether the infrared emission tube is turned on or turned off, since ambient light contains infrared light components, the infrared light with higher intensity is received by the infrared receiving tube, so that the infrared receiving tube is always in a saturated state, there is almost no difference between X1 and X2, and then the mobile robot misjudges that the ground is in a cliff state, and thereby takes an action to avoid danger; or moves away from the wall surface and cannot get close to the wall edge to perform actions such as sweeping, mopping, and the like. In the environment of the ground on which a black carpet is laid or the wall surface covered by a black light-absorbing material, no matter whether the infrared emission tube is turned on or turned off, the infrared light emitted by the infrared emission tube is mostly absorbed by the black carpet or the black material, and the small part of the infrared light is not enough to exhibit a significant change in magnitude of the signal of the infrared receiving tube, thus it is also misjudged that it is in a cliff state or cannot get close to the wall edge.

SUMMARY

The technical problem to be solved by the present disclosure is that the traditional ground detection system and wall surface detection system cannot operate in both special operating environments where a surface to be detected is irradiated by strong light and where a surface to be detected is a black light-absorbing surface, which leads to a misjudgment, for this purpose, an embodiment of the present disclosure provides a mobile robot comprising:

a body and a drive system, the drive system being connected to the body and configured to drive a movement of the mobile robot;

a light emitter carried by the body and configured to emit light toward a surface to be detected;

a photoelectric sensor carried by the body and responsive to light from an environment and/or emitted by the light emitter;

a variable impedance unit connected to the photoelectric sensor and configured to have a reduced impedance when the photoelectric sensor is responsive to light of a preset intensity; and a control unit configured to adjust the light emitter to form at least two operating states in which light is emitted at different intensities, wherein in the operating state other than a last operating state, if a sampling difference value determined when the light emitter is in an OFF state and in an ON state does not satisfy a preset condition, an operating state of the light emitter is changed to prevent occurrence of a misjudgment causing the mobile robot to perform an unexpected action.

an embodiment of the present disclosure provides a mobile robot comprising: a body and a drive system for driving a movement of the mobile robot, a light emitter for emitting light toward a surface to be detected, a photoelectric sensor responsive to light from an environment and/or emitted by the light emitter, a variable impedance unit connected to the photoelectric sensor and having a reduced impedance when the photoelectric sensor is responsive to light of a preset intensity, and a control unit, where the light emitter is controlled by the control unit to form at least two operating states in which light is emitted at different intensities, and in the operating state other than the last operating state, if a sampling difference value determined when the light emitter is in the OFF state and in the ON state does not satisfy a preset condition, an operating state of the light emitter is changed to prevent occurrence of a misjudgment which would cause the mobile robot to perform an unexpected action, thereby enabling the mobile robot to operate in both special operating environments where a surface to be detected is irradiated by strong light and where a surface to be detected is a black light-absorbing surface.

BRIEF DESCRIPTION OF DRAWINGS

In order to more clearly illustrate the technical solutions of the examples of the present disclosure or in the prior art, brief description is made below on the drawings required to be used in the description of the examples or the prior art. Obviously, the drawings in the following description only illustrate some of the examples of the present disclosure, and for those of ordinary skills in the art, other variations may be obtained from these drawings without inventive efforts.

DETAILED DESCRIPTION OF EMBODIMENTS

Figure 1:
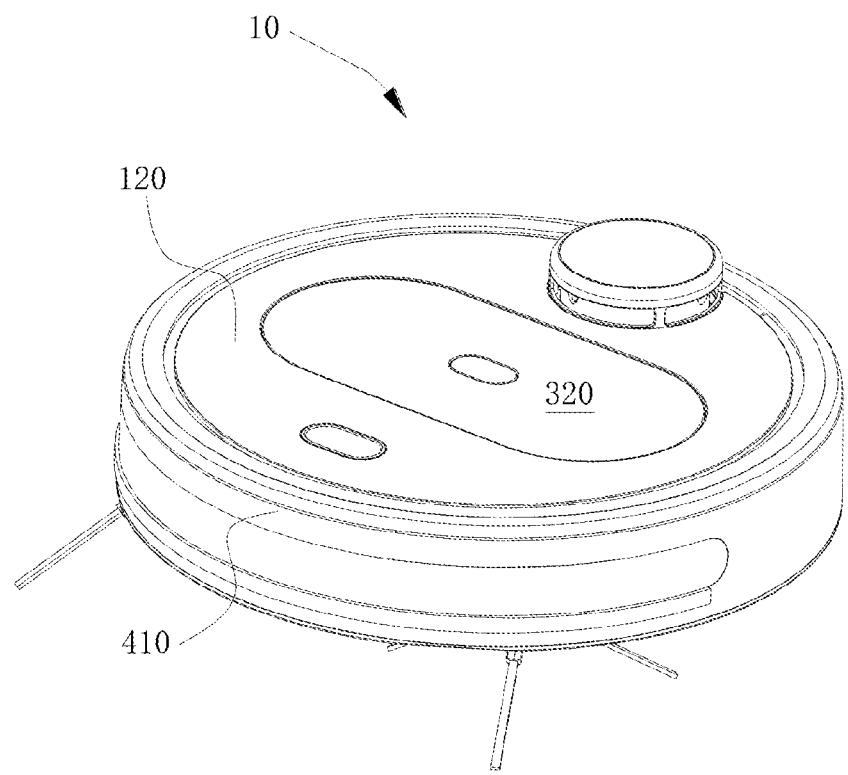
FIG. 1 is a schematic structural diagram of a mobile robot of an embodiment of the present disclosure.

The technical solutions in examples of the present disclosure are clearly described below with reference to the drawings in examples of the present disclosure. Apparently, the described examples are merely some of the embodiments of the present disclosure, rather than all the examples. Based on the examples in the present disclosure, all the other examples obtained by those of ordinary skills in the art without inventive efforts shall be covered by the protection scope of the present disclosure.

In embodiments of the present disclosure, singular expressions may include plural expressions unless otherwise defined explicitly. Moreover, the terms such as "including" or "having" are used to express the presence of features, numbers, steps, operations, constituent elements, components, or a combination thereof recited in the specification, without excluding the presence or additional possibilities of one or more other features, numbers, steps, operations, constituent elements, components, or combinations thereof. Furthermore, the terms containing ordinal numbers, such as "first" and "second", used in the specification may be used to describe various constituent elements, but the constituent elements are not limited by the above terms, and the terms are only used to distinguish one constituent element from other constituent elements.

Hereinafter, the embodiments of the present disclosure disclosed will be described in detail with reference to the accompanying drawings. The same reference numerals or signs shown in the drawings may denote components or constituent elements that perform substantially the same function.

Figure 2:
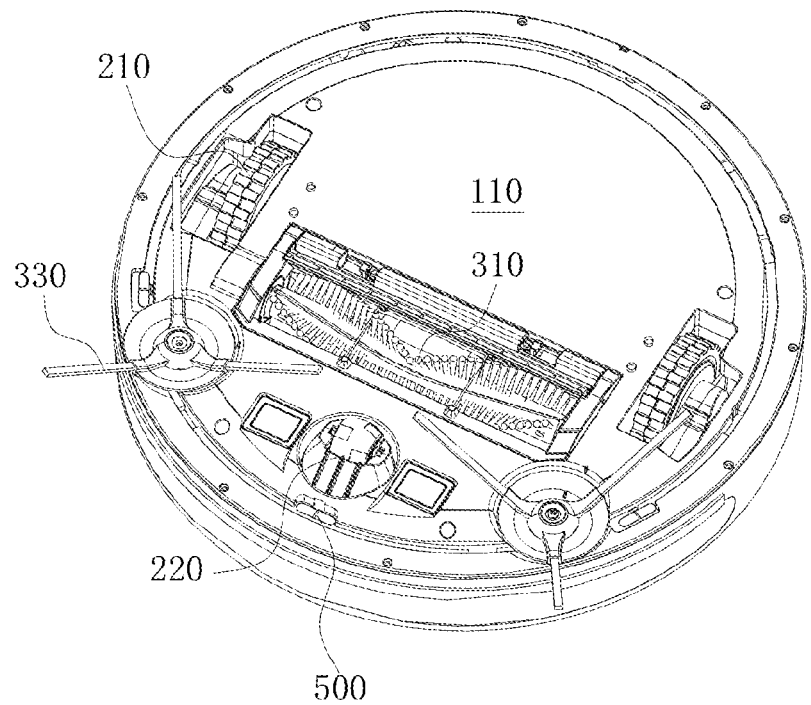
FIG. 2 is a schematic structural diagram showing a bottom structure of the mobile robot of FIG. 1.

FIG. 1 is a schematic structural diagram of a mobile robot of an embodiment of the present disclosure, and FIG. 2 is a schematic diagram showing a bottom structure of the mobile robot shown in FIG. 1.

Referring to FIG. 1 and FIG. 2, in the embodiment of the present disclosure, a mobile robot 10 is described as a cleaning robot as an example, the cleaning robot including, but not limited to, a sweeper, a vacuum cleaner, a mopping machine, etc; in other optional embodiments, the mobile robot 10 may also be a care-giving robot, a meal-delivery robot, a guest-guiding robot, a remotely controlled camera robot, or the like.

The mobile robot 10 comprises a body which may comprise a chassis 110 and an upper cover 120, where the upper cover 120 is detachably mounted to the chassis 110 to protect various functional components inside the mobile robot 10 from intense impact or damage by an inadvertently spilled liquid during use; and the chassis 110 and/or the upper cover 120 are used for carrying and supporting the various functional components. In an optional embodiment, the body of the mobile robot 10 may also be of other design configurations, for example, the body has an integrally formed structure, or a structure with left and right parts disposed separately. The material, shape, structure, and so on of the body are not limited in the embodiment of the present disclosure.

The mobile robot 10 comprises a drive system which is connected to the body and configured to drive the mobile robot 10 to move on the ground, for example, the mobile robot 10 may be designed to autonomously plan a path on the ground, or may be designed to move on the ground in response to a remote control instruction. In an embodiment of the present disclosure, the drive system comprises two wheels 210, at least one universal wheel 220, and a motor for driving a rotation of the wheels 210, where the wheels 210 and the universal wheel 220 protrude at least partially from the bottom of the chassis 110, and for example, the two wheels 210 may be partially hidden in the chassis 110 under the weight of the mobile robot 10 itself. In an optional embodiment, the drive system may also include any one of a triangular crawler wheel, a Mecanum wheel, and the like.

The mobile robot 10 may further comprise a sweeping system, for example, the sweeping system includes one or more of a middle sweeping bristle brush 310, a middle sweeping rubber brush, and a middle sweeping mixing brush provided with a bristle brush and a rubber brush at its exterior. The middle sweeping brush 310, the middle sweeping rubber brush, and the middle sweeping mixing brush are adapted to be disposed in a receiving groove provided at the bottom of the chassis 110, and the receiving groove is provided with a dust suction port, which communicates with a dust collecting box 320 and a dust suction fan so that dust and garbage on the ground are stirred up when the middle sweeping bristle brush 310 is rotated, and a suction force is generated by the dust suction fan to suck the dust and garbage from the dust suction port into the dust collecting box 320. In addition to being provided with the middle sweeping bristle brush 310 and/or the middle sweeping rubber brush and/or the middle sweeping mixing brush, the mobile robot 10 may also contain an edge sweeper 330, the edge sweeper 330 has a sweeping coverage area extending beyond the range of an outer contour of the body, which is advantageous to effective sweeping of wall edges, corners, and edges of obstacles.

The mobile robot 10 may further comprise a mopping system. For example, the mopping system comprises a water storage tank, a rag, and the like, and the water storage tank may be disposed separately from or designed integrally with the dust collecting box 320. In an optional embodiment, water in the water storage tank is sucked by a water suction pump and uniformly dripped onto the rag, and the ground is wiped with the wetted rag when the mobile robot 10 is moving on the ground. In an optional embodiment, the water in the water storage tank is atomized by an atomizer such that water mist is formed and sprayed to the ground, and then the ground sprayed by the water mist is wiped with the rag.

The mobile robot 10 may comprise a collision sensing device which is formed on at least a part of an outer periphery of the body. In the embodiment of the present disclosure, the collision sensing device comprises a collision part 410 surrounding the outer periphery of the body, and a sensor and an elastic mechanism disposed between the body and the collision part 410, the arrangement of the elastic mechanism and the sensor between the collision part 410 and the body includes, but is not limited to, the following cases: 1) the elastic mechanism and the sensor are located between the collision part 410 and the body; 2) the elastic mechanism and/or the sensor is mounted on the body, but a portion of the elastic mechanism and/or the sensor is located between the collision part 410 and the body; 3) the elastic mechanism and/or the sensor is mounted on the collision part 410, but a portion of the elastic mechanism and/or the sensor is located between the collision part 410 and the body; and 4) the elastic mechanism and/or the sensor is mounted on the collision part 410 and the body. The elastic mechanism is used for maintaining a uniform movement gap between the collision part 410 and the body, and the sensor is used for sensing a relative displacement between the collision part 410 and the body. The sensor may be any one or more of a micro switch, a Hall switch, an infrared photoelectric switch, etc., and a plurality of sensors may be disposed between the body and the collision part 410, for example, at least one sensor is distributed between the body and the collision part 410 at each of locations at the front and both sides of the mobile robot 10. The sensor is usually electrically connected to a certain control unit, processor or control system (not shown) on the mobile robot 10 to facilitate capturing of data from the sensor so as to control the mobile robot 10 to make a corresponding action. Since the collision part 410 surrounds the body, a relative displacement will be generated between the collision part 410 and the body no matter which portion of the collision part 410 collides with an obstacle during walking of the mobile robot 10. Since the sensor can sense the relative displacement between the collision part 410 and the body, the mobile robot 10 can sense the collision with the obstacle. The mobile robot 10 can change the direction of movement to bypass the obstacle colliding therewith or take other countermeasures.

Figure 3:
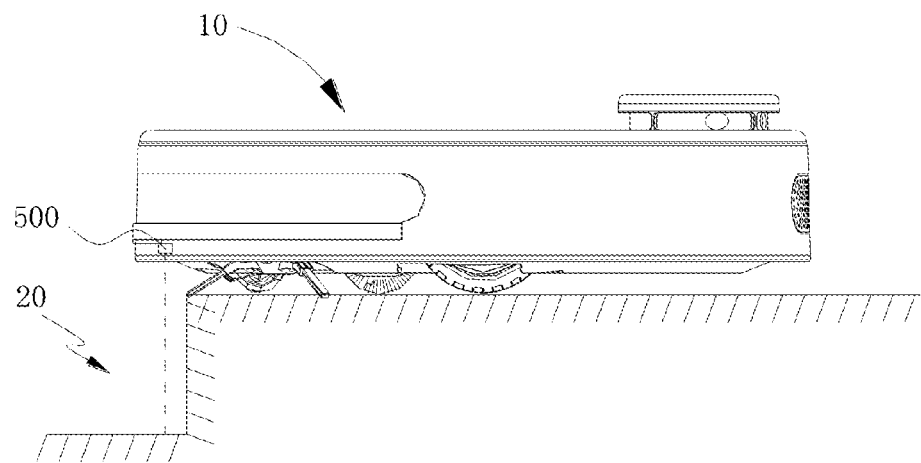
FIG. 3 is a diagram of a scenario when a light detecting module of the mobile robot is applied to the detection of a cliff.
Figure 4:
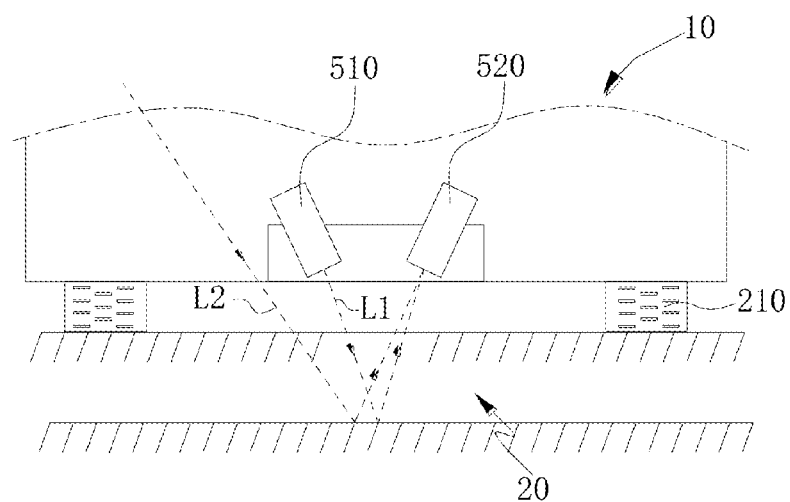
FIG. 4 is a schematic diagram showing that a photoelectric sensor receives light emitted from a light emitter and ambient light in the scenario shown in FIG. 3.

FIG. 3 is a diagram of a scenario when a light detecting module 500 of a mobile robot 10 in an embodiment of the present disclosure is applied to the detection of a cliff 20, and FIG. 4 is a schematic diagram showing that a photoelectric sensor 520 receives light L1 emitted from a light emitter 510 and ambient light L2 in the scenario shown in FIG. 3.

Referring to FIG. 3 and FIG. 4, in an embodiment of the present disclosure, the light emitter 510 is carried by the body and configured to emit light toward the ground, and the photoelectric sensor 520 is carried by the body and is responsive to light from the environment and/or emitted by the light emitter 510 and reflected by the ground.

Specifically, the light emitter 510 and the photoelectric sensor 520 are arranged adjacently at the bottom of the mobile robot 10, when the mobile robot 10 is moving on the ground, the light emitter 510 may emit light perpendicularly toward the ground, or may emit light L1 toward the ground at a certain angle relative to the photoelectric sensor 520, similarly, the photoelectric sensor 520 may be disposed at the bottom of the mobile robot 10 perpendicularly toward the ground, or may be disposed at the bottom of the mobile robot 10 at a certain angle relative to the light emitter 510.

In an embodiment of the present disclosure, the light emitter 510 is configured to emit infrared light toward the ground, and the photoelectric sensor 520 is responsive to the infrared light from the environment and/or emitted by the light emitter 510 and reflected by the ground, that is to say, the light emitter 510 includes an infrared light emission tube, and the photoelectric sensor 520 includes an infrared light receiving tube; in fact, the infrared light in the environment is generated mainly by sunlight, lamplight, etc., in most cases, the environment in which the mobile robot 10 operates is inevitably affected by sunlight or lamplight, therefore, in order to reduce the effect of infrared light in the environment, a signal of the infrared light receiving tube (denoted as X1) is captured by turning on the infrared light emission tube for a period of time, and then the infrared light emission tube is closed for a period of time to capture the signal of the infrared light receiving tube (denoted as X2); since the generation of the signal X1 is affected by both the infrared light in the environment and the infrared light emitted by the light emitter 510, and the generation of the signal X2 is affected by the infrared light in the environment, a difference (denoted as X3) is calculated between the signal X1 and the signal X2, and then it is judged whether the difference X3 stays within a preset threshold range so as to judge whether the mobile robot 10 encounters a cliff. It should be noted that the term "cliff" mentioned in this specification refers to a case where there is a certain drop in height relative to the ground on which the mobile robot 10 is currently located.

In a practical application, when the mobile robot 10 encounters a cliff, the infrared light emitted by the light emitter 510 is emitted to the cliff, only a small amount of the reflected infrared light is received by the photoelectric sensor 520, and the difference X3 is very small; and when the mobile robot 10 does not encounter a cliff, the infrared light emitted by the light emitter 510 is emitted to the ground, a large amount of the reflected infrared light is received by the photoelectric sensor 520, and the difference X3 is relatively large, therefore it can be judged based on the difference X3 whether the mobile robot 10 encounters a cliff.

Figure 5:
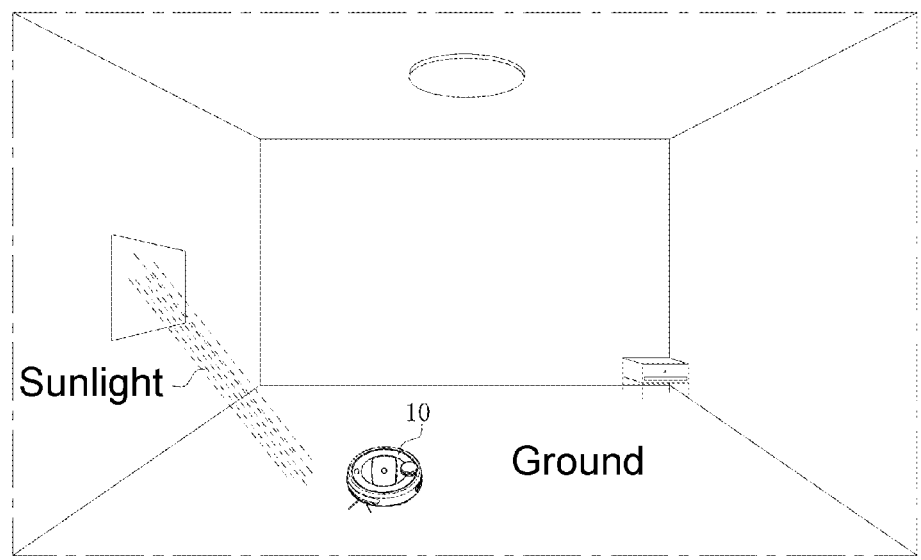
FIG. 5 is a schematic diagram of an application scenario in which the mobile robot operates in a room irradiated with relatively strong sunlight.

FIG. 5 is a schematic diagram of an application scenario in which the mobile robot 10 operates in a room irradiated with relatively strong sunlight; for example, in the special case of FIG. 5, the ground is irradiated with relatively strong sunlight, and the infrared light receiving tube is saturated due to the limitation of its own characteristics, that is to say, when the intensity of the infrared light emitted to the infrared light receiving tube reaches a certain level, the intensity of the current of the infrared light receiving tube obtained by photoelectric conversion tends to be stable, therefore there is no significant difference between the magnitudes of the signal X1 and the signal X2, and the difference X3 is very small; as can be seen in combination with the above-mentioned method of judging whether the mobile robot 10 encounters a cliff, the ground irradiated with strong light is easily misjudged as a cliff by the mobile robot 10, and thereby the mobile robot performs unexpected actions such as retreating and turning, which causes the mobile robot 10 to be unable to cover the ground area irradiated by strong light; and when the mobile robot 10 is a cleaning robot, the cleaning robot is caused to be unable to clean the ground area irradiated by strong light, resulting in missed cleaning (leaving it uncleaned).

For another example, when the mobile robot 10 encounters a black carpet laid on the ground, since the black carpet has strong light absorptivity, most of the infrared light emitted from the light emitter 510 is absorbed by the black carpet, only a small amount of the reflected infrared light is received by the photoelectric sensor 520, the infrared light receiving tube may not conduct due to the limitation of the characteristics of the infrared light receiving tube itself, and the difference X3 is zero or the difference X3 is very small; as can be seen in combination with the above-mentioned method of judging whether the mobile robot 10 encounters a cliff, the ground on which a light absorptive material such as a black carpet is laid is easily misjudged as a cliff by the mobile robot 10, and thereby the mobile robot performs unexpected actions such as retreating and turning, which causes the mobile robot 10 to be unable to cover the ground area on which a light absorptive material such as a black carpet is laid; and when the mobile robot 10 is a cleaning robot, the cleaning robot is caused to be unable to clean the ground area on which a light absorptive material such as a black carpet is laid, resulting in missed sweeping (leaving it not swept).

Figure 6:
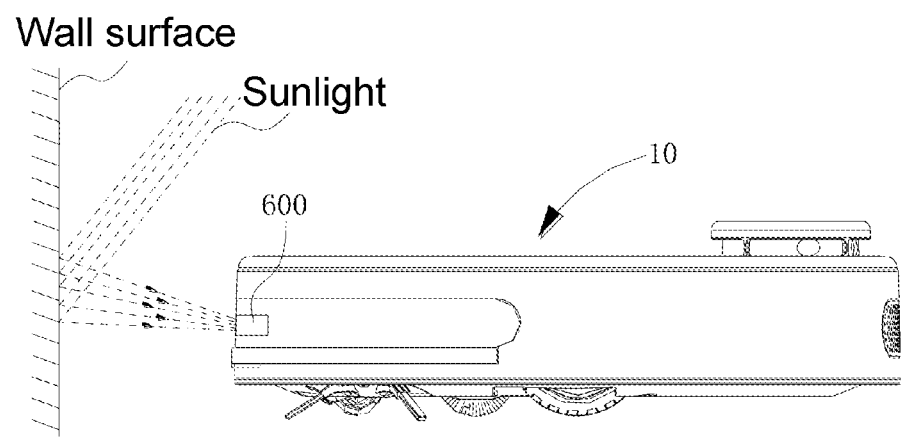
FIG. 6 is a diagram of a scenario when a light detecting module of the mobile robot is applied to the detection of a wall surface.

FIG. 6 is a diagram of a scenario when a light detecting module 600 of a mobile robot 10 in an embodiment of the present disclosure is applied to the detection of a wall surface. Referring to FIG. 6, in an embodiment of the present disclosure, the light detecting module 600 is disposed on the outer periphery of the body, and there may be a plurality of the light detecting modules 600, and for example, the plurality of light detecting modules 600 are arranged at intervals along the outer periphery of the body. Here, each light detecting module 600 comprises a light emitter and a photoelectric sensor paired with each other. For the relative positional relationship between the light emitter and the photoelectric sensor in the light detecting module 600, reference may be made to the relative positional relationship between the light emitter 510 and the photoelectric sensor 520 in the light detecting module 500, and details thereof are not described herein.

In an embodiment of the present disclosure, the light emitter is configured to emit infrared light toward a wall surface, and the photoelectric sensor is responsive to the infrared light from the environment and/or emitted by the light emitter, that is to say, the light emitter includes an infrared light emission tube, and the photoelectric sensor includes an infrared light receiving tube; in fact, the infrared light in the environment is mainly generated by sunlight, lamplight, etc., in most cases, the environment in which the mobile robot 10 operates is inevitably affected by sunlight or lamplight, therefore, in order to reduce the effect of infrared light in the environment, a signal of the infrared light receiving tube (denoted as X1) is captured by turning on the infrared light emission tube for a period of time, and then the infrared light emission tube is closed for a period of time to capture the signal of the infrared light receiving tube (denoted as X2); since the generation of the signal X1 is affected by both the infrared light in the environment and the infrared light emitted by the light emitter, and the generation of the signal X2 is affected by the infrared light in the environment, a difference (denoted as X3) is calculated between the signal X1 and the signal X2, and then it is judged whether the difference X3 stays within a preset threshold range, thereby it can be judged whether the mobile robot 10 has approached a surface to be detected such as a wall surface or an obstacle.

In a practical application, when the mobile robot 10 has not yet approached a surface to be detected such as a wall surface or an obstacle, the infrared light emitted by the light emitter in the light detecting module 600 is emitted to the surroundings, only a small amount of the reflected infrared light is received by the photoelectric sensor in the light detecting module 600, and the difference X3 is very small; and when the mobile robot 10 has approached a surface to be detected such as a wall surface or an obstacle, the infrared light emitted by the light emitter is emitted to the surface to be detected such as a wall surface or an obstacle, a large amount of the reflected infrared light is received by the photoelectric sensor, and the difference X3 is relatively large, therefore it can be judged based on the difference X3 whether the mobile robot 10 has approached the surface to be detected such as a wall surface or an obstacle; in the case where it is judged that the mobile robot 10 has approached the surface to be detected such as a wall surface or an obstacle, the mobile robot 10 is usually controlled to perform an evasive action such as deceleration, turning, or retreating.

For example, in the special case of FIG. 6, the wall surface is irradiated with relatively strong sunlight, and the infrared light receiving tube is saturated due to the limitation of its own characteristics, that is to say, when the intensity of the infrared light emitted to the infrared light receiving tube reaches a certain level, the intensity of the current of the infrared light receiving tube obtained by photoelectric conversion tends to be stable, therefore there is no significant difference between the magnitudes of the signal X1 and the signal X2, and the difference X3 is very small; as can be seen in combination with the above-mentioned method of judging whether the mobile robot 10 has approached a surface to be detected such as a wall surface or an obstacle, encountering a surface to be detected such as a wall surface or an obstacle that is irradiated with strong light is easily misjudged by the mobile robot 10 as a case where it has not yet approached the wall surface, the obstacle, or the like, and thereby the mobile robot keeps an unexpected action such as a continued movement at the maintained original speed or an accelerated movement, which causes the mobile robot 10 to violently collide with the wall surface, the obstacle, or the like.

For another example, when the mobile robot 10 encounters a surface to be detected such as a wall surface or an obstacle that is covered with a black light-absorbing material, since the black light-absorbing material has strong light absorptivity, most of the infrared light emitted from the light emitter in the light detecting module 600 is absorbed by the black light-absorbing material, only a small amount of the reflected infrared light is received by the photoelectric sensor, the infrared light receiving tube may not conduct due to the limitation of the characteristics of the infrared light receiving tube itself, and the difference X3 is zero or the difference X3 is very small; as can be seen in combination with the above-mentioned method of judging whether the mobile robot 10 has approached a surface to be detected such as a wall surface or an obstacle, encountering a surface to be detected such as a wall surface or an obstacle that is covered with a black light-absorbing material is easily misjudged by the mobile robot 10 as a case where it has not yet approached the wall surface, the obstacle, or the like, and thereby the mobile robot keeps an unexpected action such as a continued movement at the maintained original speed or an accelerated movement, which causes the mobile robot 10 to violently collide with the wall surface, the obstacle, or the like.

Figure 7:
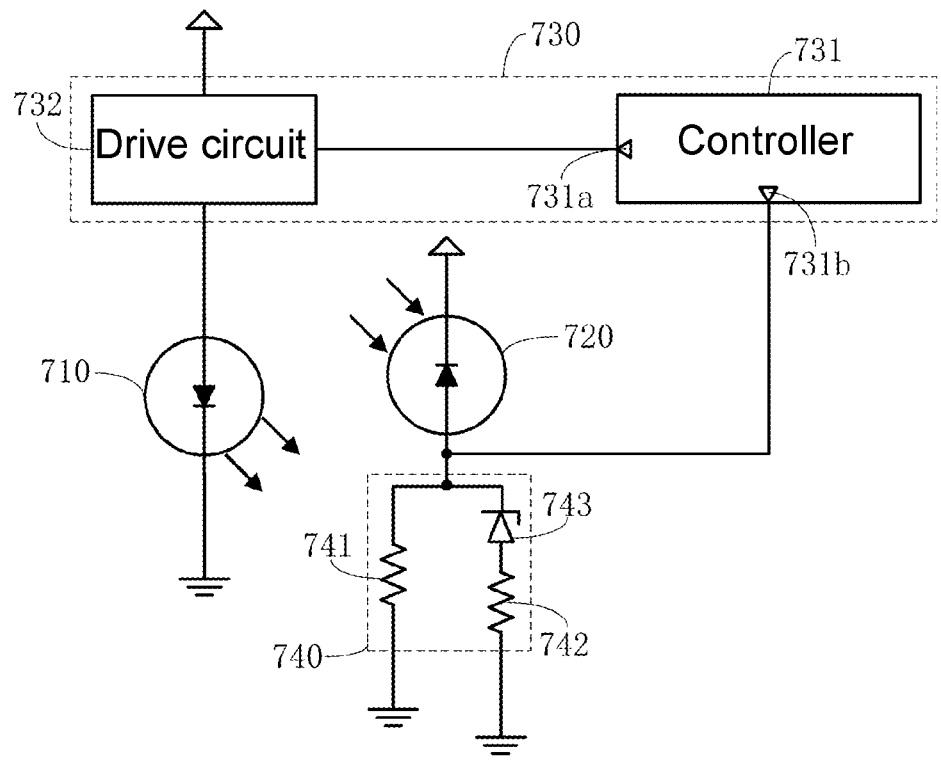
FIG. 7 is a circuit diagram of an embodiment applied to the mobile robot.
Figure 8:
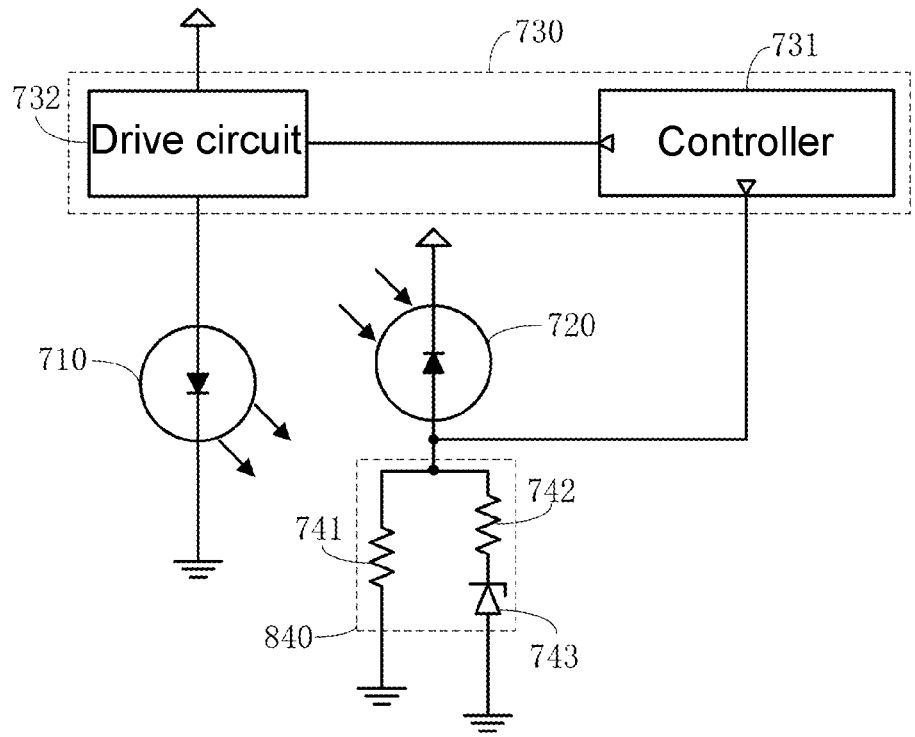
FIG. 8 is a circuit diagram of another embodiment applied to the mobile robot.

In a mobile robot 10 of an embodiment of the present disclosure, a light emitter 710 and a photoelectric sensor 720 are applied to a circuit diagram shown in FIG. 7 or FIG. 8, and the above a misjudgment problem is solved in cooperation with the logic for control of the light emitter 710 by a control unit 730 and the characteristic of a variable impedance unit 740 or a variable impedance unit 840 having a reduced impedance when the photoelectric sensor 720 is responsive to light of a preset intensity. The light emitter 510 in the light detecting module 500 or the light emitter in the light detecting module 600 may be described with reference to the light emitter 710 of FIG. 7 or FIG. 8, and the photoelectric sensor 520 in the light detecting module 500 or the photoelectric sensor in the light detecting module 600 may be described with reference to the photoelectric sensor 720 in FIG. 7 or FIG. 8.

The circuit diagrams in FIG. 7 and FIG. 8 are different in the variable impedance unit. Specifically, in FIG. 7, the variable impedance unit 740 comprises a first resistor 741, a second resistor 742, and a Zener diode 743, one end of the first resistor 741 and a cathode of the Zener diode 743 are connected to the photoelectric sensor 720, the other end of the first resistor 741 is grounded, and an anode of the Zener diode 743 is grounded via the second resistor 742. Specifically, in FIG. 8, the variable impedance unit 840 comprises a first resistor 741, a second resistor 742, and a Zener diode 743, one end of each of the first resistor 741 and the second resistor 742 is connected to the photoelectric sensor 720, the other end of the first resistor 741 is grounded, the other end of the second resistor 742 is connected to a cathode of the Zener diode 743, and an anode of the Zener diode 743 is grounded.

Hereinafter, the circuit diagram in FIG. 7 will be taken as an example to describe in detail how the control unit 730 solves the above a misjudgment problem by the logic for control of the light emitter 710 and the characteristic of the variable impedance unit 740 having a reduced impedance when the photoelectric sensor 720 is responsive to light of a preset intensity.

When the mobile robot 10 encounters a ground or wall surface with normal brightness and a ground on which a black carpet is laid or a wall surface covered by a black light-absorbing material, the intensity of light received by the photoelectric sensor 720 is not sufficient to cause the Zener diode 743 to conduct; and when the mobile robot 10 encounters a ground or wall surface irradiated with strong light and having high reflectivity, the intensity of the light received by the photoelectric sensor 720 causes the Zener diode 743 to conduct. It can be easily known that when the Zener diode 743 conducts, the preset intensity reached by the light received by the photoelectric sensor 720 can be adjusted by selecting a Zener diode 743 having different conducting voltages and a second resistor 742 having different resistances.

When the Zener diode 743 does not conduct, the impedance of the variable impedance unit 740 is determined by the first resistor 741; and when the Zener diode 743 conducts, the impedance of the variable impedance unit 740 is determined by the first resistor 741 and the second resistor 742 connected in parallel, thus it can be seen that from a non-conducting state to a conducting state of the Zener diode 743, the impedance of the variable impedance unit 740 is reduced, and the sensitivity of the photoelectric sensor 720 is lowered, in other words, a stronger light intensity is required to enable the photoelectric sensor 720 to reach a saturated state. When the mobile robot 10 encounters a ground or wall surface irradiated with strong light and having high reflectivity, the control unit 730 can still capture an effective difference X3 to prevent a misjudgment.

In summary, the control unit 730 is configured to adjust the variable impedance unit 740 to form at least two operating states in which light is emitted at different intensities. In the operating state other than the last operating state, if a sampling difference value determined when the light emitter 710 is in the OFF state and then in the ON state does not satisfy a preset condition, an operating state of the light emitter 710 is changed to prevent occurrence of a misjudgment which would cause the mobile robot 10 to perform an unexpected action.

In an embodiment of the present disclosure, the control unit 730 comprises a controller 731 and a drive circuit 732 connected to the controller 731 and the light emitter 710, the drive circuit 732 is configured to adjust the light emitter 710 in response to a control instruction of the controller 731 to form at least two operating states in which light is emitted at different intensities. The drive circuit 732 may include a constant current source circuit or a constant voltage source circuit. In a practical application, the controller 731 controls the drive circuit 732 through an outputted control instruction, and the drive circuit 732 adjusts the emission power of the light emitter 710 according to the control instruction, thereby achieving the adjustment of the luminous intensity of the light emitter 710 to form at least two operating states in which light is emitted at different intensities.

In an embodiment of the present disclosure, the variable impedance unit 740 is constructed by a line connection between the first resistor 741, the second resistor 742, and the Zener diode 743, in other embodiments, the variable impedance unit 740 may be constructed in other forms, which may be considered to be adopted as long as it satisfies the characteristic of having a reduced impedance when the photoelectric sensor 720 is responsive to light of a preset intensity.

The controller 731 may be a micro control unit such as a single chip microcomputer, an FPGA, an ASIC, a DSP, or the like, and the drive circuit 732 and/or the variable impedance unit 740 may be integrated in the controller 731 to form an integrated control unit 730 or may exist as a peripheral circuit of the controller 731.

In an embodiment of the present disclosure, the controller 731 has a control end 731a and a sampling end 731b, wherein the control end 731a is connected to the light emitter 710, and the sampling end 731b is connected between the photoelectric sensor 720 and the variable impedance unit 740.

Specifically, the controller 731 controls the drive circuit 732 through a control instruction outputted by the control end 731a to adjust the luminous intensity of the light emitter 710, so as to form two operating states in which light is emitted at different intensities, for convenience of description, the two operating states are defined as a first operating state and a second operating state, respectively, and light emitted when the light emitter 710 is in the first operating state has an intensity less than that of light emitted when the light emitter 710 is in the second operating state.

Figure 9:
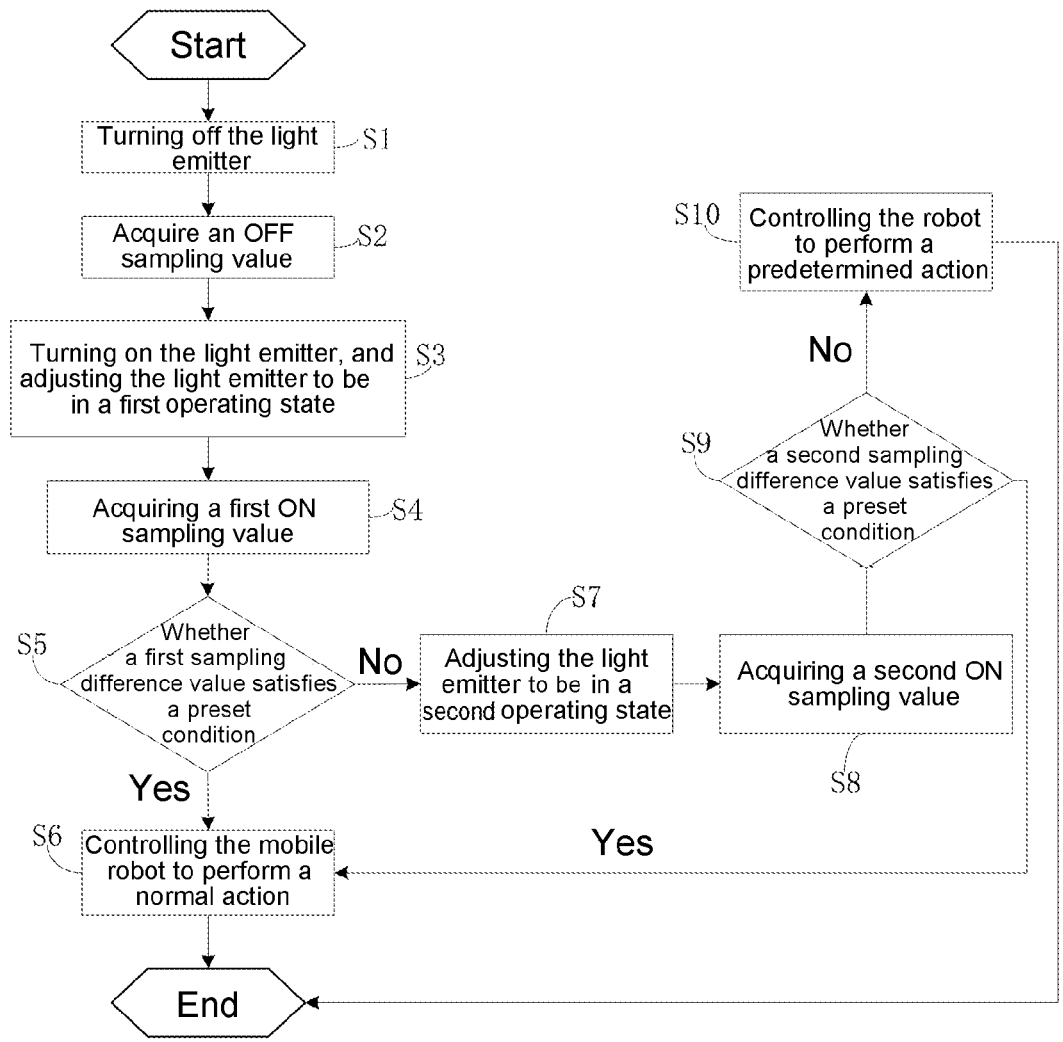
FIG. 9 is a flowchart of method steps that a control unit in the mobile robot is configured to perform.

As shown in FIG. 9, it is a flowchart of steps performed by the controller 731 in an embodiment of the present disclosure.

After the mobile robot 10 starts operating, the controller 731 performs a step S1 of turning off the light emitter 710 through the control end 731a.

When the light emitter 710 is OFF, the controller 731 performs a step S2 of acquiring an OFF sampling value through the sampling end 731b.

Then, the controller 731 performs a step S3 of turning on the light emitter 710 and adjusting the light emitter 710 to be in the first operating state through the control end 731a.

When the light emitter 710 is ON and in the first operating state, the controller 731 performs a step S4 of acquiring a first ON sampling value through the sampling end 731b.

Then, the controller 731 performs a step S5 of judging whether a first sampling difference value satisfies a preset condition, wherein the first sampling difference value is determined by a difference between the first ON sampling value and the OFF sampling value, in other words, the first sampling difference value is equal to the difference between the first ON sampling value and the OFF sampling value. Whether the first sampling difference value satisfies the preset condition may include whether the first sampling difference value stays within a preset threshold range, or may include whether the first sampling difference value is greater than a preset minimum threshold.

If the first sampling difference value satisfies the preset condition, the controller 731 performs a step S6 of controlling the mobile robot 10 to perform a normal action. When a surface to be detected is the ground, in the case where the first sampling difference value satisfies the preset condition, the controller 731 judges that the mobile robot 10 encounters a flat surface without drop in height, and the normal action may be an expected action such as continued forward movement, turning, or the like. In the case where the first sampling difference value satisfies the preset condition, when the light emitter 710 and the photoelectric sensor 720 are disposed at the front part of the mobile robot 10, the controller 731 judges that the mobile robot 10 encounters a wall, an obstacle, or the like, and the normal action may be an expected action such as decelerated approaching, turning, or the like; when the light emitter 710 and the photoelectric sensor 720 are disposed on the lateral side of the mobile robot 10 and the surface to be detected is a wall surface or a surface of an obstacle, the controller 731 judges that the mobile robot 10 encounters a continuous flat surface or the like, and the normal action may be an expected action such as continued sweeping along the edge. If the first sampling difference value does not satisfy the preset condition, the controller 731 performs a step S7 of adjusting the light emitter 710 to be in the second operating state through the control end 731a.

When the light emitter 710 is ON and in the second operating state, the controller 731 performs a step S8 of acquiring a second ON sampling value through the sampling end 731b.

Then, the controller 731 performs a step S9 of judging whether a second sampling difference value satisfies a preset condition, wherein the second sampling difference value is determined by a difference between the second ON sampling value and the OFF sampling value, in other words, the second sampling difference value is equal to the difference between the second ON sampling value and the OFF sampling value.

If the second sampling difference value satisfies the preset condition, the controller 731 performs the step S6 of controlling the mobile robot 10 to perform a normal action.

If the second sampling difference value does not satisfy the preset condition, the controller 731 performs a step S10 of controlling the mobile robot 10 to perform a predetermined action. When the surface to be detected is the ground, if the second sampling difference value does not satisfy the preset condition, the controller 731 judges that the mobile robot 10 encounters a cliff having a drop in height, and the predetermined action may be an evasive action such as retreating, turning, or the like; in the case where the second sampling difference value does not satisfy the preset condition, when the light emitter 710 and the photoelectric sensor 720 are disposed at the front part of the mobile robot 10, the controller 731 judges that the mobile robot 10 does not encounter a wall, an obstacle, or the like, and the predetermined action may be an expected action such as continued forward movement, turning, or the like; when the light emitter 710 and the photoelectric sensor 720 are disposed on the lateral side of the mobile robot 10 and the surface to be detected is a wall surface or a surface of an obstacle, the controller 731 judges that the mobile robot 10 may encounter a discontinuous detection surface formed at the corner of a wall or an obstacle, or may encounter an open area formed at the doorway, and the predetermined action may be an expected action such as sweeping along the wall edge, or sweeping along the edge of the obstacle.

In order to prevent an error caused by a single sampling, a method of obtaining an average value by sampling multiple times may be used. Specifically, when the light emitter 710 is in the OFF state, the controller 731 acquires a plurality of OFF sampling values through the sampling end 731b, and obtains an average OFF sampling value based on the plurality of OFF sampling values; and the controller 731 acquires, when the light emitter is in the ON state, a plurality of ON sampling values through the sampling end 731b, and obtains an average ON sampling value based on the plurality of ON sampling values, wherein the sampling difference value is a difference between the average ON sampling value and the average OFF sampling value.

An embodiment of the present disclosure provides a mobile robot 10 comprising: a body and a drive system for driving a movement of the mobile robot 10, a light emitter 710 for emitting light toward a surface to be detected, a photoelectric sensor 720 responsive to light from an environment and/or emitted by the light emitter 710, a variable impedance unit 740 connected to the photoelectric sensor 720 and having a reduced impedance when the photoelectric sensor 720 is responsive to light of a preset intensity, and a control unit 730, where the light emitter 710 is controlled by the control unit 730 to form at least two operating states in which light is emitted at different intensities, and in the operating state other than the last operating state, if a sampling difference value determined when the light emitter 710 is in the OFF state and then in the ON state does not satisfy a preset condition, an operating state of the light emitter 710 is changed to prevent occurrence of a misjudgment which would cause the mobile robot 10 to perform an unexpected action, thereby enabling the mobile robot 10 to operate in both special operating environments where a surface to be detected is irradiated by strong light and where a surface to be detected is a black light-absorbing surface.

In the description of the specification of the present disclosure, the terms "one embodiment", "some embodiments", "an example", "a specific example", or "an optional embodiment", etc., means that a particular feature, structure, material or characteristic described in connection with the embodiment or example is included in at least one embodiment or example of the present disclosure. In the specification of the present disclosure, the indicative representation of the above terms does not necessarily refer to the same embodiments or examples. Moreover, the description of the specific characteristic, structure, material, or feature can be combined in an appropriate manner in any one or more embodiments or examples.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

The invention claimed is:

1. A mobile robot, comprising:
   a body and a drive system, the drive system being connected to the body and configured to drive a movement of the mobile robot;
   a light emitter carried by the body and configured to emit light toward a surface to be detected;
   a photoelectric sensor carried by the body and responsive to light from an environment and/or emitted by the light emitter;

a variable impedance unit connected to the photoelectric sensor and configured to have a reduced impedance when the photoelectric sensor is responsive to light of a preset intensity; and a control unit configured to adjust the light emitter to form at least two operating states in which light is emitted at different intensities, wherein in the operating state other than a last operating state, if a sampling difference value determined when the light emitter is in an OFF state and in an ON state does not satisfy a preset condition, an operating state of the light emitter is changed to prevent occurrence of a misjudgment causing the mobile robot to perform an unexpected action, wherein the control unit has a control end connected to the light emitter and a sampling end connected between the photoelectric sensor and the variable impedance unit and the control unit is configured to:

adjust the light emitter through the control end to form at least two operating states in which light is emitted at different intensities;

turn off or turn on the light emitter through the control end in the operating state other than the last operating state, and acquire an OFF sampling value or an ON sampling value through the sampling end when the light emitter is in the OFF state or in the ON state; and change the operating state of the light emitter to prevent occurrence of a misjudgment causing the mobile robot to perform an unexpected action, if the sampling difference value determined by a difference between the ON sampling value and the OFF sampling value does not satisfy the preset condition.

2. The mobile robot according to claim 1, wherein the control unit is configured to:

acquire, when the light emitter is in the OFF state, a plurality of OFF sampling values through the sampling end and obtain an average OFF sampling value based on the plurality of OFF sampling values; and acquire, when the light emitter is in the ON state, a plurality of ON sampling values through the sampling end and obtain an average ON sampling value based on the plurality of ON sampling values, wherein the sampling difference value is a difference between the average ON sampling value and the average OFF sampling value.

3. The mobile robot according to claim 1, wherein the control unit is configured to:

turn off the light emitter through the control end;
acquire an OFF sampling value through the sampling end;
turn on the light emitter through the control end, and adjust the light emitter to be in a first operating state;
acquire a first ON sampling value through the sampling end when the light emitter is in a first operating state;
judge whether a first sampling difference value determined by a difference between the first ON sampling value and the OFF sampling value satisfies the preset condition, wherein if not, the light emitter is adjusted through the control end to be in a second operating state, and if yes, the mobile robot is controlled to perform a normal action;
acquire a second ON sampling value through the sampling end when the light emitter is in the second operating state; and
judge whether a second sampling difference value determined by a difference between the second ON sampling value and the OFF sampling value satisfies the preset condition, wherein if not, the mobile robot is controlled to perform a predetermined action, and if yes, the mobile robot is controlled to perform a normal action.

4. The mobile robot according to claim 3, wherein the light emitter and the photoelectric sensor are disposed in pair at a bottom of the body, and the light emitter is configured to emit light toward ground.

5. The mobile robot according to claim 3, wherein the light emitter and the photoelectric sensor are disposed in pair on an outer periphery of the body, and the light emitter is configured to emit light toward a wall surface.

6. The mobile robot according to claim 1, wherein the light emitter is configured to emit infrared light toward the surface to be detected, and the photoelectric sensor is responsive to infrared light from the environment and/or emitted by the light emitter.

7. The mobile robot according to claim 1, wherein the variable impedance unit comprises a first resistor, a second resistor and a Zener diode, one end of the first resistor and a cathode of the Zener diode are connected to the photoelectric sensor, the other end of the first resistor is grounded, and an anode of the Zener diode is grounded via the second resistor.

8. The mobile robot according to claim 1, wherein the variable impedance unit comprises a first resistor, a second resistor, and a Zener diode, one end of each of the first resistor and the second resistor is connected to the photoelectric sensor, the other end of the first resistor is grounded, the other end of the second resistor is connected to a cathode of the Zener diode, and an anode of the Zener diode is grounded.

9. The mobile robot according to claim 1, wherein the control unit comprises a controller and a drive circuit connected to the controller and the light emitter, and the drive circuit is configured to adjust the light emitter in response to a control instruction of the controller to form at least two operating states in which light is emitted at different intensities.

10. The mobile robot according to claim 9, wherein the drive circuit comprises a constant current source circuit or a constant voltage source circuit.

11. The mobile robot according to claim 1, wherein the light emitter is configured to emit infrared light toward the surface to be detected, and the photoelectric sensor is responsive to infrared light from the environment and/or emitted by the light emitter.

12. The mobile robot according to claim 3, wherein the light emitter is configured to emit infrared light toward the surface to be detected, and the photoelectric sensor is responsive to infrared light from the environment and/or emitted by the light emitter.

13. The mobile robot according to claim 4, wherein the light emitter is configured to emit infrared light toward the surface to be detected, and the photoelectric sensor is responsive to infrared light from the environment and/or emitted by the light emitter.

14. The mobile robot according to claim 2, wherein the variable impedance unit comprises a first resistor, a second resistor, and a Zener diode, one end of the first resistor and a cathode of the Zener diode are connected to the photoelectric sensor, the other end of the first resistor is grounded, and an anode of the Zener diode is grounded via the second resistor.

15. The mobile robot according to claim 4, wherein the variable impedance unit comprises a first resistor, a second resistor, and a Zener diode, one end of the first resistor and a cathode of the Zener diode are connected to the photoelectric sensor, the other end of the first resistor is grounded, and an anode of the Zener diode is grounded via the second resistor.

16. The mobile robot according to claim 5, wherein the variable impedance unit comprises a first resistor, a second resistor, and a Zener diode, one end of the first resistor and a cathode of the Zener diode are connected to the photoelectric sensor, the other end of the first resistor is grounded, and an anode of the Zener diode is grounded via the second resistor.

17. The mobile robot according to claim 1, wherein the variable impedance unit comprises a first resistor, a second resistor, and a Zener diode, one end of each of the first resistor and the second resistor is connected to the photoelectric sensor, the other end of the first resistor is grounded, the other end of the second resistor is connected to a cathode of the Zener diode, and an anode of the Zener diode is grounded.

18. The mobile robot according to claim 3, wherein the variable impedance unit comprises a first resistor, a second resistor, and a Zener diode, one end of each of the first resistor and the second resistor is connected to the photoelectric sensor, the other end of the first resistor is grounded, the other end of the second resistor is connected to a cathode of the Zener diode, and an anode of the Zener diode is grounded.

19. The mobile robot according to claim 5, wherein the variable impedance unit comprises a first resistor, a second resistor, and a Zener diode, one end of each of the first resistor and the second resistor is connected to the photoelectric sensor, the other end of the first resistor is grounded, the other end of the second resistor is connected to a cathode of the Zener diode, and an anode of the Zener diode is grounded.

* * * * *